3,120,505
ETHERS IN PASTE RESIN PRODUCTION
Calvin G. McCubbin, North Madison, and William D. Jones, Painesville, Ohio, assignors to Diamond Alkali Company, Cleveland, Ohio, a corporation of Delaware
No Drawing. Filed Aug. 21, 1959, Ser. No. 835,193
18 Claims. (Cl. 260—87.1)

This invention relates to improvements in emulsion polymerization of polymerizable unsaturated monomers, especially vinyl chloride, either alone, or in suitable proportions with other unsaturated monomers. More particularly, the invention is concerned with the production of what is known as paste resins.

The manufacture of aqueous dispersions of various synthetic resins by the direct polymerization of polymerizable monomeric materials, for example, vinyl chloride and mixtures thereof with other polymerizable monomeric materials in aqueous emulsion in the presence of an emulsifying agent is well known. The resulting polymerization mass is in the form of a synthetic latex from which, in the production of paste resins, the polymer is precipitated or otherwise obtained, as by spray drying, in powder form. These dry powdery resins are then mixed with a plasticizer to form a paste-like mass which is known as a plastisol, the plasticizer being a liquid organic material which is compatible with the polymer to form a stable dispersion. At ordinary room temperature, such compositions are fluid in the sense that they can be poured from a container, but they are relatively viscous as compared with water. When heated to an elevated temperature, solvation of the polymer particles by the plasticizer occurs which is followed by fusion so that when the mixture is cooled a substantially homogeneous body of plasticized synthetic resin is produced.

Plastisols may be employed in various ways, as by moulding, extruding, in dipping processes, spreading, coating, or the like. In these various applications, a number of physical characteristics are important and desirable to be present in the plastisol. Thus, characteristics such as viscosity, stability of the resin itself under the effects of heat, and stability of the plastisol in the sense that it does not increase in viscosity excessively at room temperature with the passage of a reasonable time are among important characteristics. In large measure, these properties may be controlled by employing appropriate techniques in the polymerization reaction; however, it has not been without considerable difficulty that plastisols have been produced which afford all of these several characteristics to the desired degree and at the same time. It may be said that the prime purpose of this invention is to provide an improved emulsion polymerization process which will afford a polymer product especially suitable for dispersion with plasticizers to produce a plastisol providing outstanding conformity to the above-mentioned desirable characteristics.

In order to simplify presentation of the invention herein, it is desired to dispense with the use of terms such as "copolymers," "interpolymers," "terpolymers," "copolymerization" and the like. Accordingly, it is to be understood that where the words polymer, polymeric, and polymerization and the like are used, these words are to be understood to extend to and include processes and products where more than one monomer is employed in the polymerization reaction to form a copolymer, terpolymer, etc. For example, these terms are intended to include processes and products that employ as little as 50 percent vinyl chloride with the remainder being one or more additional monomers to form interpolymers including copolymers and terpolymers.

Polymeric materials containing vinyl chloride are well known for their instability under the effects of heat and light. Various means have been employed in an effort to overcome this disadvantage. In the main, this has involved the addition of stabilizing materials to the polymer, such as basic substances and organo-metallic compounds. By these means, it is possible to varying extents to improve the stability of the polymers, but oftentimes the flow properties of the product are impaired, and, generally, they detract from the transparency of the final product.

Care must be exercised in selecting the emulsifier for the process since oftentimes agents which are good emulsifiers and effect other improvements affect heat stability deleteriously. As will be seen in considering this invention, there is provided a process leading to resins of improved flow properties wherein heat stability is not significantly impaired by the materials employed in the process.

According to this invention, it has been found that remarkably improved properties may be imparted to paste resins, particularly polyvinylchloride, by utilizing as the emulsifier in the emulsion polymerization process certain fatty-ether-sulfate salts. By following the teachings herein, it is found that viscosity characteristics are greatly improved without harm to heat stability. Moreover, when proceeding in the manners preferred herein, the shelf life of the resulting plastisol is lengthened. Also, a high solids (resin) content plastisol with consequent less plasticizer requirements may be obtained. The emulsifier referred to above and more fully described hereinafter may be and preferably is employed while observing certain process conditions and techniques whereby to produce finished products of especially outstanding properties.

The invention herein contemplates employing as the emulsifying agent fatty ether sulfates. These materials may be represented by the following formula:

$$R(O-R')_nOSO_3Y$$

where R is an aryl group, e.g., benzene, or a saturated hydrocarbon chain containing from 6 to about 20 carbon atoms, inclusive, which chain may be straight or branched, and may include chain substituents, for example, hydroxy; R' is a saturated hydrocarbon chain containing 1 to 3 carbon atoms, inclusive, which chain may be branched; n is an integer from 1 to 10, inclusive; and Y is a cation selected from the group consisting of alkali metals, alkaline earth metals, ammonia and alkanol amines containing up to six carbon atoms.

Among compounds suitable for use in the invention falling within the above designation are the following: 2-palmitoxy ethyl sodium sulfate, 2-lauroxy ethyl sodium sulfate, 2-myristoxy ethyl sodium sulfate, 2-stearoxy ethyl sodium sulfate, 2-oleoxy ethyl sodium sulfate, 2-tridecyl ethyl sodium sulfate, 2-capryloxy ethyl sodium sulfate, 2-caproxy ethyl sodium sulfate, 2-(14 hydroxy stearoxyl) ethyl sodium sulfate; compounds otherwise similar to any of the foregoing but where ethyl is replaced by a propyl radical; also, compounds otherwise similar to any of the foregoing but where the organic chain portion, i.e., the R portion of the general formula $R(OR')_nOSO_3Y$ is linked to the ethyl or propyl portion through an ethoxy or propoxy group which may be a mono or poly grouping, e.g., 2-(lauroxy ethoxy) ethyl sodium sulfate, $$(C_{12}H_{27}OCH_2CH_2OCH_2CH_2OSO_3Na)$$

2-(palmitoxy diethoxy) ethyl sodium sulfate, $$(C_{16}H_{33}OCH_2CH_2OCH_2CH_2OCH_2CH_2OSO_3Na)$$

2-(myristoxy tripropoxy) propyl sodium sulfate,

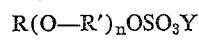
$$(C_{13}H_{27}OCH_2CH_2CH_2OCH_2CH_2CH_2OCH_2$$
$$CH_2CH_2OCH_2CH_2CH_2OSO_3Na)$$

2-(lauroxy tetraethoxy) ethyl sodium sulfate, (C$_{12}$H$_{27}$OCH$_2$CH$_2$OCH$_2$CH$_2$OCH$_2$CH$_2$OCH$_2$CH$_2$OCH$_2$CH$_2$OSO$_3$Na)

and compounds otherwise similar to any of the foregoing but where sodium is replaced by potassium, calcium, barium, strontium, lithium, cesium, ammonium or alkanol amines of up to 6 carbon atoms.

Especially preferred compounds are those where R is a saturated unsubstituted chain containing from 8–18 carbon atoms, R' is ethyl or propyl and $n$ is not greater than 5 and the cation is either sodium or potassium. Especially suitable as the agent for use in the invention is 2-lauroxy ethyl sodium sulfate (sodium lauryl ether sulfate).

The emulsifier, which also may be referred to as a plastisol viscosity depressant since it effects this action concomitantly with the emulsifying action it provides may be employed within relatively wide quantity limits. The amounts of emulsifier indicated throughout the specification and appended claims are on the basis of 100% active material. Improved results are achieved when as little as 0.2 percent based upon the weight of the monomer or monomers to be reacted is employed; and, up to 2 percent on the same basis may be used. However, an amount between about 0.4 and 0.9 percent is especially suitable and is preferred. The emulsifier and viscosity depressant mentioned above may be employed alone or in conjunction with other known suitable emulsifying agents, e.g., sodium lauryl sulfate, sodium alkyl benzene sulfonate and sodium tridecyl sulfate, but at least about 75% of total emulsifier content should be of the ether type herein preferred in order to accomplish the desirable viscosity depressing action.

In employing the emulsifying agents herein described to effect improvements in viscosity characteristics, any suitable catalyst system may be employed with necessary technique to obtain a plastisol resin. Thus, if a monomer-soluble catalyst, such as lauroyl peroxide, is employed the system must be homogenized whereas when a water-soluble catalyst is employed, homogenization of the system is not necessary. The catalyst may be any of the water-soluble, free-radical-generating catalysts ordinarily used in the production of polyvinyl chloride and similar latices, such as ammonium persulfate, sodium persulfate, potassium persulfate, and the like. Generally, the catalyst will be employed to the extent of about 0.003 to about 3 percent, usually about 0.02 to 1 percent, based upon the weight of the monomeric materials in the reaction charge. Preferably, the redox catalyst system is employed. This general system is well-known and may be found described in many United States patents as well as numerous publications. Advantageously, sodium or potassium metabisulfite and sodium or potassium persulfate are employed. In operation, the bisulfite may be introduced into the reaction zone with the initial charge and the persulfate introduced continuously or intermittently to provide the desired reaction rate and rate control; also both components can be introduced separately during the polymerization but they cannot both be charged initially or mixed prior to adding during the run since the active life of the system is very short when mixed, and therefore, must be kept separate until used in the reaction. For simplicity of operation, enough sodium metabisulfite to complete the reaction is added initially and then a water solution of potassium persulfate is metered to the reaction to provide the desired reaction rate. The ingredients of the redox system suitably are employed in the reaction at about a 1:1 weight ratio; however, this is not critical and may be varied as desired.

The obtaining of the advantages of improved viscosity characteristic of resinous materials afforded by the use of the fatty ether sulfate salt type agents herein described does not depend on particular polymerization process details. Thus, the emulsifying agents herein may be employed under any generally suitable process conditions looking to the production of plastisol-suitable resin. As illustrative of the invention as it is more broadly envisioned, the following examples are provided, the parts indicated being by weight.

EXAMPLE 1

*Seed Latex Preparation*

A suitable seed latex is prepared utilizing the following materials:

| | |
|---|---|
| Water | 21 gallons. |
| Sodium metabisulfite | 20 grams. |
| Sodium lauryl sulfate | 12 grams. |
| Vinyl chloride monomer | 150 pounds. |
| Potassium persulfate | 7½ grams. |
| Sodium lauryl sulfate | 420 grams in 3 gallons of water. |

The water, at approximately room temperature, is delivered to a 50-gallon reactor, after which the sodium metabisulfite and the 12-gram portion of sodium lauryl sulfate are added and thoroughly mixed with the water by agitation. The reactor is closed and held under vacuum for a short time and is then purged with vinyl chloride to displace the air. The monomer is then charged to the reactor, the temperature of which is then raised to about 110° to 125° F. (however, suitably 100° to 140° F.) with continuous agitation. A portion of the potassium persulfate is added to initiate the reaction and the balance is added slowly to maintain the reaction rate. Shortly after polymerization has been initiated, addition of the 420-gram portion of sodium lauryl sulfate is begun and it is continued slowly throughout the reaction cycle. When the reaction is completed (noted by a pressure drop of 20 to 40 lbs.), the remaining monomer is stripped off. In this example the reaction time is about twelve hours. The contents of the reactor comprise a seed latex containing approximatey 38% to 40% solids.

EXAMPLE 2

*Preparation of Paste Resin*

Materials: Amounts
| | |
|---|---|
| Water | 21 gallons. |
| Sodium metabisulfite | 20 grams. |
| Sodium lauryl sulfate | 12 grams. |
| Seed latex (from Example 1) | 8 pounds. |
| Vinyl chloride monomer | 150 pounds. |
| Potassium persulfate | 7½ grams. |
| Sodium lauryl sulfate | 420 grams in 3 gallons of water. |

Following the general procedure of Example 1, the water, sodium metabisulfite, 12-gram portion of sodium lauryl sulfate and 8 pounds of the seed latex prepared in Example 1 are charged into the reactor. The vinyl chloride monomer is added after the reactor is purged with vinyl chloride. The potassium persulfate and sodium lauryl sulfate are added as before.

Upon completion of polymerization, the latex is spray-dried and ground (micro-atomized). The resin is then mixed with plasticizer to form a plastisol.

EXAMPLE 3

*Seed Latex Preparation*

Materials: Amounts
| | |
|---|---|
| Water (distilled) | 21 gallons. |
| Sodium metabisulfite | 20 grams. |
| 2-lauroxy ethyl sodium sulfate | 12 grams. |
| Vinyl chloride monomer | 150 pounds. |
| Potassium persulfate | 7½ grams. |
| 2-lauroxy ethyl sodium sulfate | 420 grams in 3 gallons of water. |

The procedure for preparing the seed latex is identical to that of Example 1 except that 2-lauroxy ethyl sodium sulfate is used to replace sodium lauryl sulfate.

EXAMPLE 4

*Preparation of Paste Resin*

The procedure of Example 2 is followed except that sodium lauryl ether sulfate (1 mole ether) is used to replate sodium lauryl sulfate in exact concentrations.

EXAMPLE 5

*Preparation of Paste Resin*

The procedure of Example 1 is followed to produce a seed latex and the procedure of Example 2 is followed to produce a paste resin except that in both cases sodium lauryl ether sulfate (3 moles of ether) is used to replace sodium lauryl sulfate.

EXAMPLE 6

*Preparation of Paste Resin*

The procedure of Example 1 is repeated exactly to produce a seed latex and the procedure of Example 2 is repeated to produce a paste resin except that in both cases sodium tridecyl sulfate is used to replace sodium lauryl sulfate.

The procedure of Example 1 is repeated exactly to produce a seed latex and the procedure of Example 2 is repeated to produce a paste resin except that in both cases sodium tridecyl ether sulfate is used to replace sodium lauryl sulfate.

EXAMPLE 8

A further example of the invention is provided by substituting 15 pounds of vinyl acetate for a corresponding portion of the vinyl chloride in both the seed latex and paste resin, the other amounts of materials and the procedures described in Examples 3 and 4 remaining the same. The product obtained is a vinyl chloride-vinyl acetate copolymer in latex form which when processed affords properties similar to the vinyl chloride resin.

EXAMPLE 9

A further example of the invention is afforded by substituting 15 pounds of vinylidene chloride for 15 pounds of the vinyl chloride employed in Examples 3 and 4, the other amounts of materials and procedures remaining the same. A paste resin of similar qualities is obtained.

The viscosities of the paste resins[1] (when formulated into plastisols) of foregoing Examples 2 through 7 are indexed compartively as follows:

| Example No. | Emulsifier | Viscosity [1] (poises) | | |
|---|---|---|---|---|
| | | Initial [2] | 24 hour | 7 day |
| 2 | sodium lauryl sulfate | 162.0 | Off scale | Off scale |
| 4 | sodium lauryl ether sulfate (1 mole ether). | 24.0 | 26.0 | 48.0 |
| 5 | sodium lauryl ether sulfate (3 moles ether). | 10.0 | 11.0 | 16.0 |
| 6 | tridecyl sodium sulfate | 25.0 | 33.2 | 76.8 |
| 7 | tridecyl ether sulfate (4 moles ether). | 6.5 | 7.2 | 14.2 |

[1] Viscosity is measured by Brookfield viscosimeter (Model RVT-200) @ 20 r.p.m., using a No. 7 Spindle @ 25° C.
[2] "Initial" viscosity measured 2 hours after mixing completed.

As the above data indicate, a singular reduction in low shear viscosity is provided by the use of the ether-containing additives of this invention. Moreover, it is observed that such a reduction in viscosity is obtained without a corresponding reduction in heat stability.

Wherever in the specification or claims herein reference is made to the "monomeric mixture" in setting forth quantities of the several materials to be employed in the reaction, this terminology should be understood to refer

[1] Plastisol=100 parts dry paste resin+60 parts dioctylphthalate mixed in a No. 50 Hobart Mixer for 15 minutes at 25° C.

to the monomer or monomers, exclusive of other materials, taking part in the polymerization reaction to form polymeric materials.

Wherever the terminology "viscosity depressing amount" is employed in the specification or claims herein, this is intended to indicate a quantity which will afford a significant measurable lowering of viscosity of a plastisol when compared with a standard plastisol which has not been derived while using the viscosity depressant and emulsifier of this invention but which otherwise has been derived in a similar manner.

In connection with the generic formula herein set forth, it has been stated preference exists for those compounds where R contains from 8–18 carbon atoms, R' is ethyl or propyl and $n$ is not greater than 5. As regards R, it is found that the suggested chain length provides better emulsifying action than other materials. As regards R', the difference effected in using ethyl or propyl is not great but is sufficient to warrant a preference since viscosity depressing action in instances is improved. As regards $n$, it is found that when $n$ is greater than 5, in instances, heat stability of the finished resin products seems not to be quite as good; therefore, the preference for $n$ not being greater than 5, and especially $n=1$ to 4, is indicated.

While the invention herein has been described in reference to various specific details, it is to be understood that it is not to be so limited and that the invention extends to such modifications as may be derived from the teachings herein and as are embraced within the appended claims.

What is claimed is:

1. A process for preparing polymeric materials from a monomeric mixture comprising vinyl chloride and a monomer selected from the group consisting of vinyl acetate and vinylidene chloride, wherein at least 50% by weight of the monomeric mixture is vinyl chloride, in contact with about 0.003% to 3% by weight of the monomeric mixture of at least one catalyst selected from the group consisting of lauroyl peroxide, ammonium persulfate, sodium persulfate, potassium persulfate, sodium metabisulfite and potassium metabisulfite and about 0.2% to 2% by weight of the monomeric mixture of an ether sulfate salt of the formula

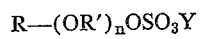

wherein R is an aliphatic hydrocarbyl radical containing 6 to 20 carbon atoms; R' is a saturated aliphatic hydrocarbyl radical containing 2 to 3 carbon atoms; $n$ is an integer from 1 to 10; and Y is a cation selected from the group consisting of alkali metals, alkaline earth metals, ammonium and alkanol amines containing up to 6 carbon atoms.

2. A process as claimed in claim 1 wherein the said mixture contains at least 95 percent by weight of said vinyl chloride.

3. A process as claimed in claim 1 wherein $n$ is not greater than 5.

4. A process as claimed in claim 1 wherein R contains at least 8 carbon atoms.

5. A process as claimed in claim 1 wherein Y is sodium.

6. A process as claimed in claim 1 wherein R' contains two carbon atoms.

7. A process as claimed in claim 1 wherein R contains at least 8 carbon atoms, R' contains not more than 2 carbon atoms, and $n$ is not greater than 5.

8. A process as claimed in claim 1 wherein R contains at least 8 carbon atoms, R' contains not more than 2 carbon atoms, $n$ is 1 to 4, inclusive, and Y is an alkali metal.

9. A process as claimed in claim 1 wherein said fatty ether sulfate salt is 2-lauroxy ethyl sodium sulfate.

10. A process as claimed in claim 1 wherein at least a major part of the quantity of said fatty ether sulfate salt to be employed is added in increments throughout the substantial entirety of the polymerization reaction whereby to effect simultaneous emulsifying action and particle size control.

11. A process as defined in claim 1 wherein said fatty ether sulfate salt is sodium tridecyl ether sulfate.

12. A process according to claim 1 wherein said mixture consists of vinyl chloride.

13. The process according to claim 1 wherein the product thereby obtained is spray dried.

14. The product obtained by the process of claim 13.

15. The process of claim 1 wherein the reaction occurs in an emulsion system and the fatty ether sulfate salt comprises at least a part of the emulsifying agent of said system.

16. The product produced by the process of claim 1.

17. The product produced by the process of claim 9.

18. The product produced by the process of claim 12.

References Cited in the file of this patent

UNITED STATES PATENTS

| | | |
|---|---|---|
| 2,535,677 | Hollander et al. | Dec. 26, 1950 |
| 2,535,678 | Hollander et al. | Dec. 26, 1950 |
| 2,624,724 | Park | Jan. 6, 1953 |
| 2,719,143 | Van Dijk et al. | Sept. 27, 1955 |
| 2,771,457 | Barnes et al. | Nov. 20, 1956 |
| 2,777,836 | Everard et al. | Jan. 15, 1957 |

OTHER REFERENCES

Becher: Emulsions: Theory and Practice, Reinhold (1957).

Moillet et al.: Surface Activity, 2nd edition, Nostrand (1961).

UNITED STATES PATENT OFFICE
CERTIFICATE OF CORRECTION

Patent No. 3,120,505                                        February 4, 1964

Calvin G. McCubbin et al.

It is hereby certified that error appears in the above numbered patent requiring correction and that the said Letters Patent should read as corrected below.

Column 5, line 8, for "plate" read -- place --; same column 5, lines 25 and 26, insert -- EXAMPLE 7 --.

Signed and sealed this 14th day of July 1964.

(SEAL)

Attest:

ESTON G. JOHNSON                                     EDWARD J. BRENNER
Attesting Officer                                        Commissioner of Patents